July 21, 1970   P. C. CONGLETON ET AL   3,521,228
COURSE CENTER LINE GENERATOR FOR AIRCRAFT DISPLAYS
Filed Jan. 13, 1967   7 Sheets-Sheet 1
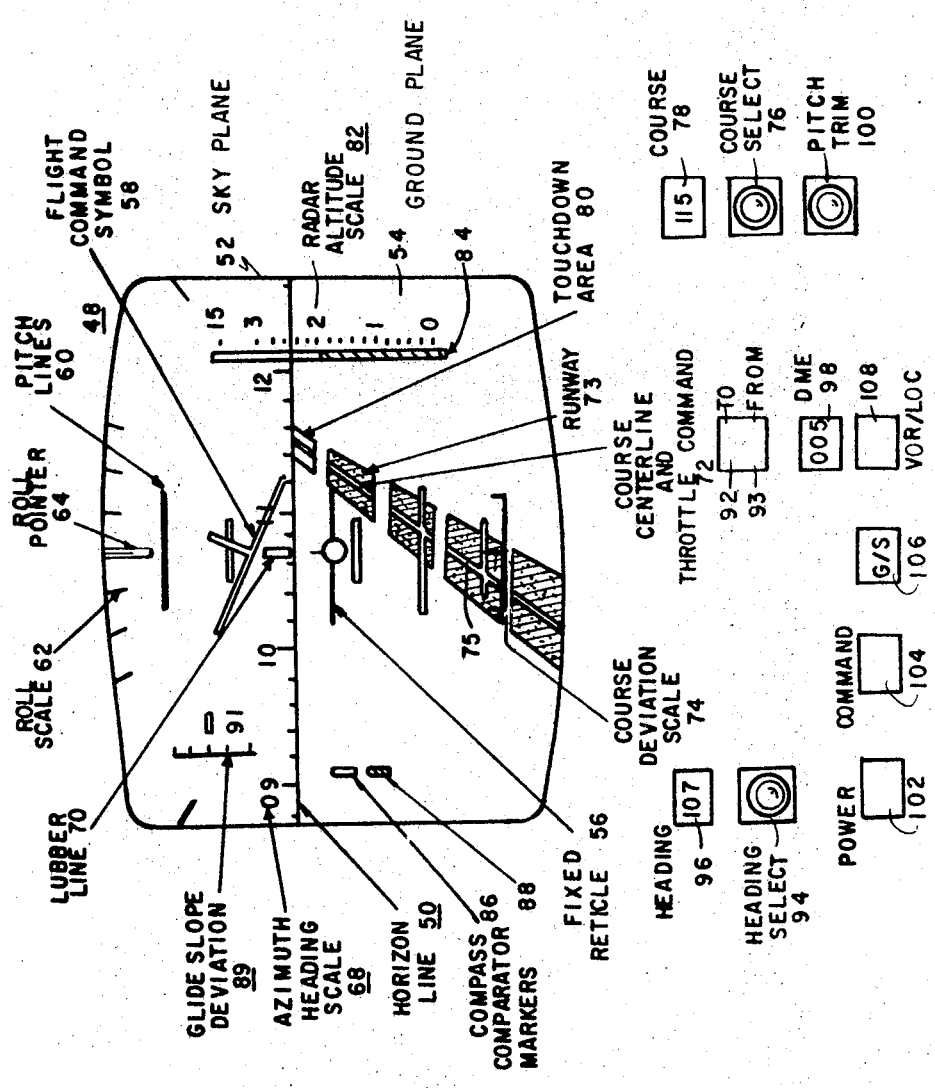
FIG. IA
INVENTORS.
PAUL C. CONGLETON
HIDEKI D. IZUMI
BY
ATTYS.

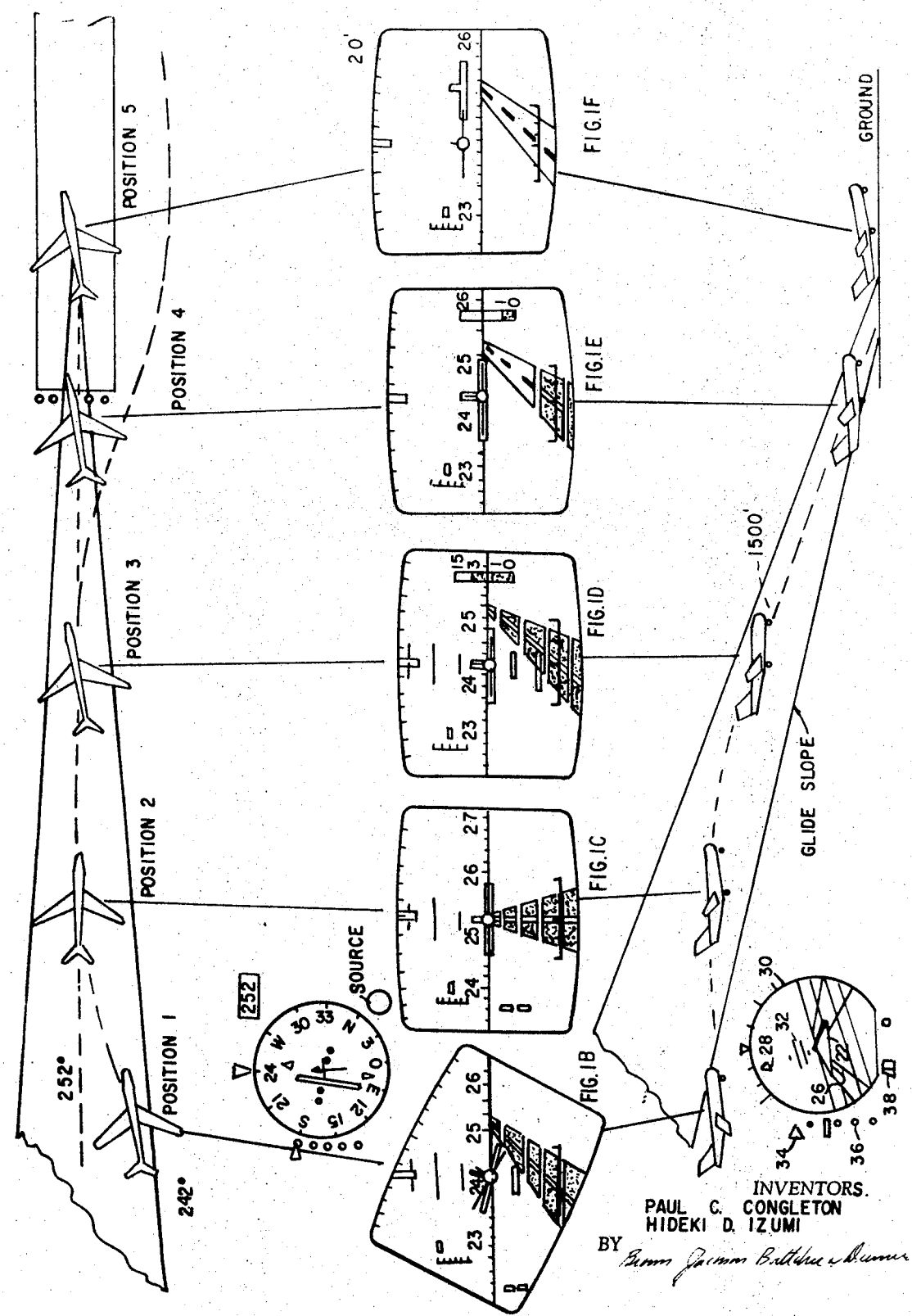

July 21, 1970 P. C. CONGLETON ET AL 3,521,228
COURSE CENTER LINE GENERATOR FOR AIRCRAFT DISPLAYS
Filed Jan. 13, 1967 7 Sheets-Sheet 3

FAR-TURN CONDITION

NEAR-TURN CONDITION

FAR-TURN AND NEAR-TURN
CONDITION

-15° PITCH-DOWN CONDITION

+15 PITCH-UP CONDITION

INVENTORS.
PAUL C. CONGLETON
HIDEKI D. IZUMI
BY
ATTYS.

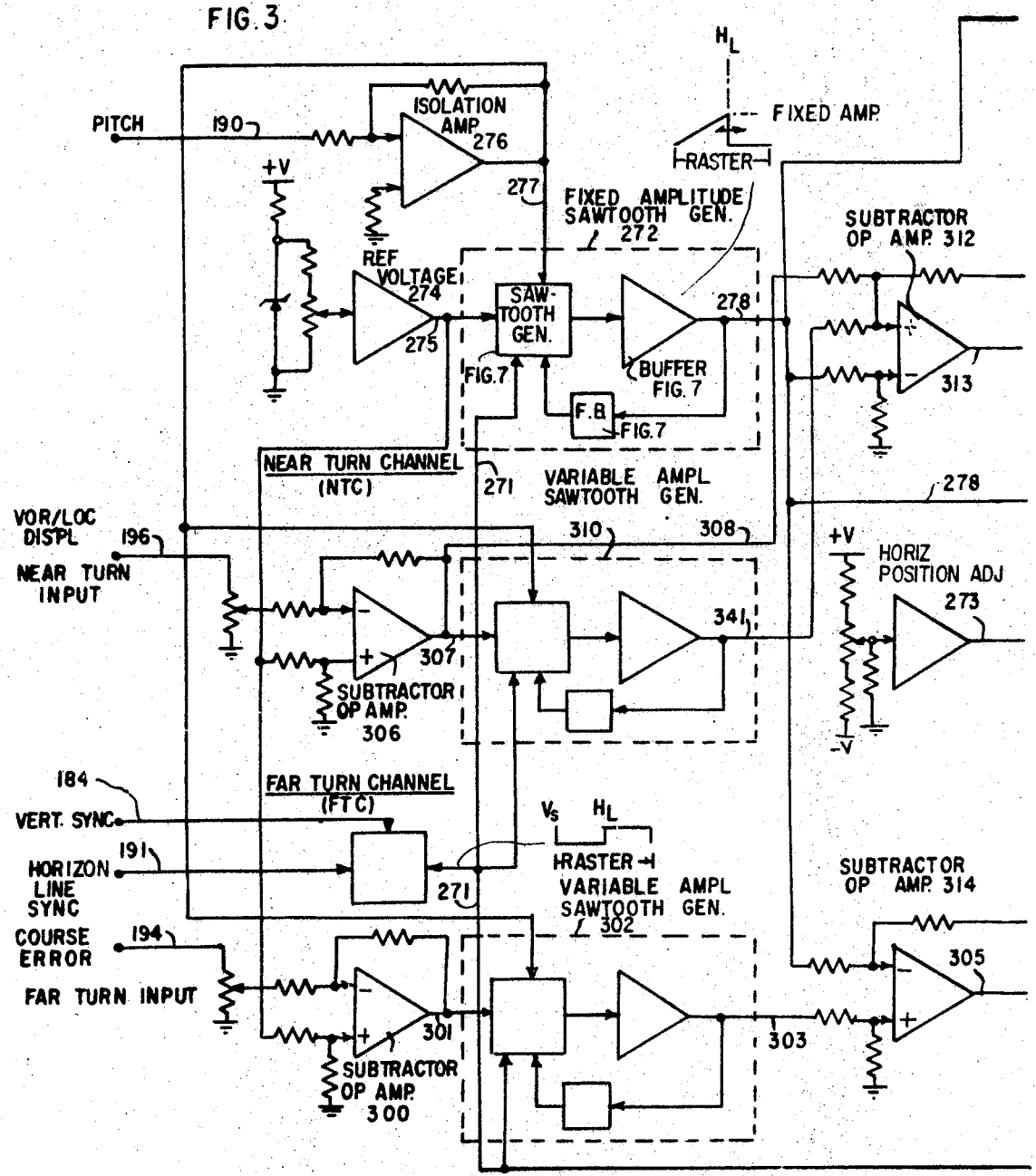

INVENTORS.
PAUL C. CONGLETON
HIDEKI D. IZUMI

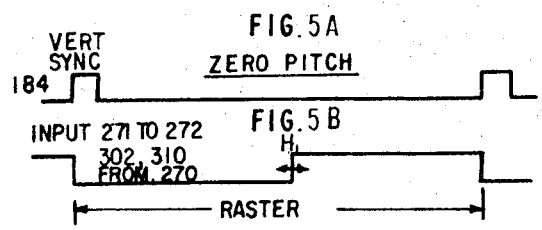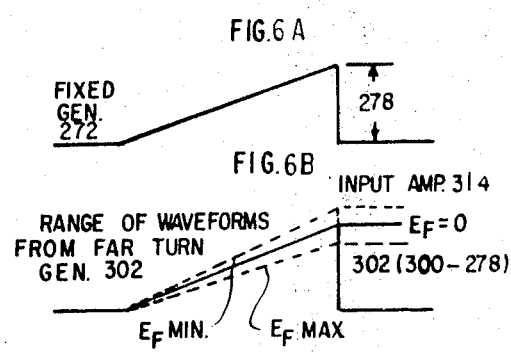

July 21, 1970     P. C. CONGLETON ET AL     3,521,228
COURSE CENTER LINE GENERATOR FOR AIRCRAFT DISPLAYS
Filed Jan. 13, 1967     7 Sheets-Sheet 7
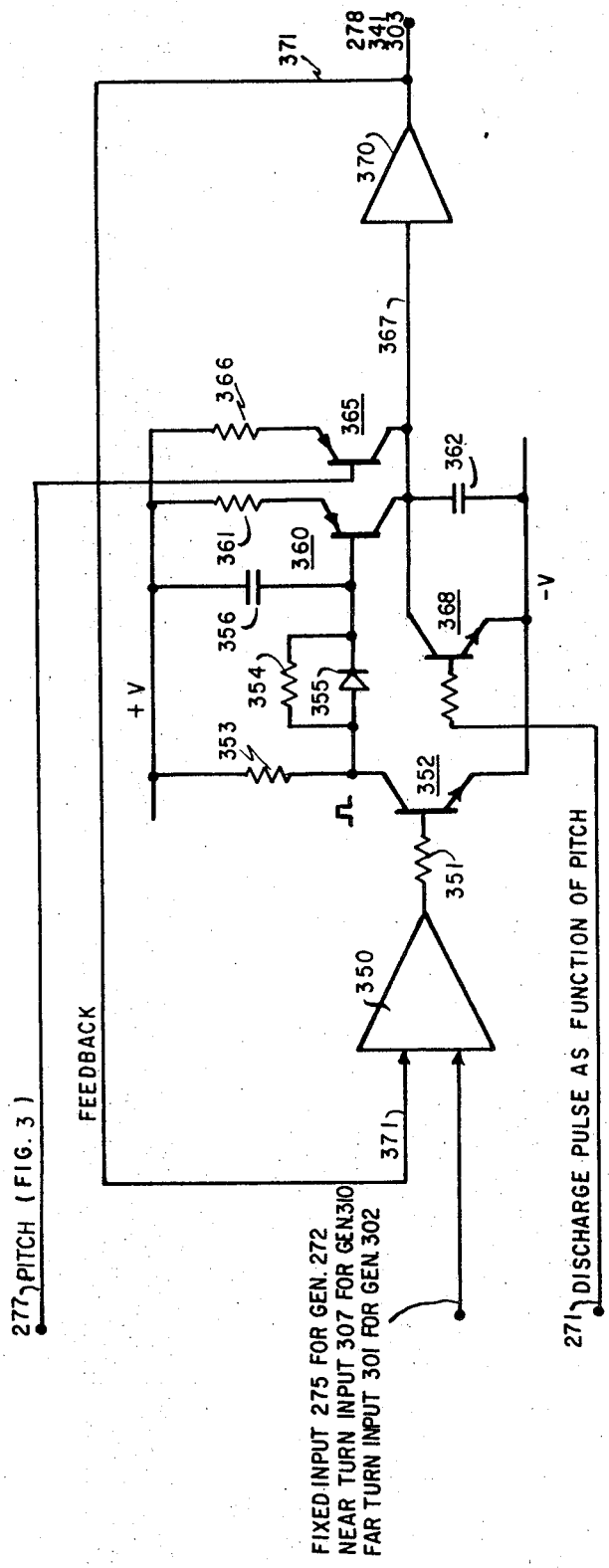
FIG. 7
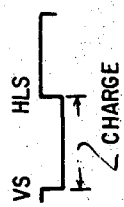
INVENTORS.
PAUL C. CONGLETON
HIDEKI D. IZUMI
BY
ATTYS.

United States Patent Office 3,521,228
Patented July 21, 1970

3,521,228
COURSE CENTER LINE GENERATOR FOR AIRCRAFT DISPLAYS
Paul C. Congleton, Menlo Park, and Hideki D. Izumi, San Jose, Calif., assignors to Kaiser Aerospace & Electronics Corporation, a corporation of Nevada
Filed Jan. 13, 1967, Ser. No. 609,109
Int. Cl. G01s 7/22
U.S. Cl. 340—27                                                25 Claims

ABSTRACT OF THE DISCLOSURE

Electronic circuitry which generates signals to provide a display of horizontal situation information for an aircraft in response to input VOR/LOC signals and course error signals from sensor equipment.

CROSS REFERENCE TO RELATED APPLICATION

The invention is specifically directed to new and novel circuitry for generating a course line display for use in a system of the type disclosed in the copending application for Display System for Providing Integrated Display of Aircraft Information, which was filed Oct. 10, 1966 by Paul C. Congleton, Hideki D. Izumi, Charles L. McAfee and Charles K. Snyder and received #585,643.

BACKGROUND OF THE INVENTION

Field of the invention

The invention pertains to the field of integrated displays for aircraft pilots, and specifically to displays which provide the aircraft pilot with horizontal situation information in an integrated display which includes aircraft attitude information and the like.

Description of the prior art

The first practical system for use in wings level flight without reference outside the aircraft to the real world comprised no more than an air speed indicator, a compass, an altimeter, an inclinometer and a rate of turn indicator. Though of relatively simple construction such instruments remain today in aircraft as a backup for the more sophisticated instruments now in use.

Progress over the years resulted in the addition, among other things, of a gyro horizon instrument from which the pilot could more graphically visualize aircraft attitude in terms of pitch and bank, and a directional gyro which provided more stability than the magnetic compass. Perhaps the most significant advance occurred with the development of navigational aids, such as automatic direction finders and omni ranges which resulted in the ability to provide a graphic representation to the pilot of aircraft position relative to a desired course. Manifestly, the provision of this increased amount of information to the pilot resulted in an increase in the number of aircraft instruments which were necessarily monitored by the pilot in flight. However, as the speeds of the aircraft increased during take-off, landing and flight, the time for instrument scan became increasingly shorter and a new problem arose.

In the early 1950's an attempt was made to combine aircraft heading, omni range deviation, aircraft attitude and flight command into a single unit known as a zero reader. The device proved to be inadequate and was short-lived. The art then progressed to the development of an attitude director indicator (essentially a gyro horizon with flight command in pitch and roll) and a horizontal situation indicator which is basically a compass with deviation indication for omni range and in some instances an automatic direction finder indicator. Such instruments are currently used in commercial aircraft.

More specifically, in order for the pilot to properly evaluate the performance of the automatic system now in use, it is necessary to provide accurate information to the pilot relating to (a) the actual attitude of the aircraft about its several axes, (b) command information indicating the attitudes to be effected to achieve the optimum flight situation, and (c) information setting forth the "horizontal situation" of the aircraft. Attitude information for example, may include the pitch, bank and heading of the aircraft. Horizontal situation information, as the name implies, includes the display of relative displacement of the aircraft from the selected course and the relationship of the course to the aircraft. Command information identifies the attitudes to be executed to reach the optimum flight condition. A novel system which incorporates such information in an integrated display is set forth in the above identified application.

In providing such display, particularly complex problems arose in providing a course line on a video display which would provide the horizontal situation information required by the pilot to evaluate the aircraft position relative to a selected course. In achieving such display, a course line must extend from the horizon on the display to the bottom of the display, the position of the far end of the line being determined by aircraft course error and the position of the near end of the line being determined by displacement of the aircraft from the selected course, the lateral displacement of the far end being of the same value independent of the pitch of the aircraft. As will be shown, the motion requirements posed on the course center line for various far turn and near turn motion signal inputs, and the relative effects of changing pitch attitude of the aircraft on the display of the course line are extremely involved. Thus, in a far turn maneuver, assuming zero near turn input condition, the course center line must pivot about a point which intersects the bottom of the screen. With a near turn input, assuming zero far turn and zero pitch conditions, the line must pivot about a point at the horizon line. When both far turn and near turn input signals are received, and when pitch down and pitch up conditions occur the provision of an accurate display becomes so complex and difficult as to defy simple description.

SUMMARY OF INVENTION

The present invention therefore provides novel circuitry which effects an integrated display including means for providing information relating to the horizontal situation of the aircraft relative to a selected course with the required degree of reliability necessary to safe aircraft flight.

It is an object of the invention to provide novel means for providing a course line display in which the position of the lower end of the line is determined by VOR/LOC signals and the far end is positioned at a coordinate on the horizon line determined by the course error signal, and is maintained at such position with changing pitch condition.

It is a specific object of the invention to provide novel circuitry of such type which includes a first generator for providing a sawtooth having a fixed amplitude, a second generator for providing a sawtooth which has a variable amplitude which equals that of the fixed sawtooth waveform for zero signal input, and which will be of a greater or smaller amplitude than that of the fixed sawtooth for signal inputs which are larger or smaller than the zero input, means for controlling the variable and fixed sawtooth duration to be a function of pitch, and means for changing the rate of generation of the slope for the variable and fixed sawtooth waveforms to maintain constant amplitude for the sawtooth independent of pitch changes.

It is an additional object of the invention to provide a device which presents a display of an approach by a mobile unit to a selected reference point, and specifically a display for an aircraft which includes a touchdown area which issues from the horizon line as the aircraft approaches the touchdown point on the runway and which moves toward the bottom of the presentation as the aircraft draws nearer to such point.

It is a further object of the invention to provide a touchdown area in combination with a course line which displays horizontal situation information for an aircraft.

BRIEF DESCRIPTION OF THE DRAWINGS

FIGS. 1A–1F are illustrations of typical displays provided by the system set forth in the above identified copending application including the novel course line and runway of the present invention and the typical horizontal situation displays which are provided thereby for different conditions of flight;

FIGS. 3 and 4 illustrate the course line generator circuitry in detail;

FIGS. 5A–5J, 6A–6F illustrate further waveforms generated by the course line generator in the provision of the different course line displays; and FIG. 7 illustrates a novel sawtooth generator used in the course line generator circuitry of FIGS. 3 and 4.

DESCRIPTION OF THE PREFERRED EMBODIMENTS

Display information provided by display device

Figure 2A:
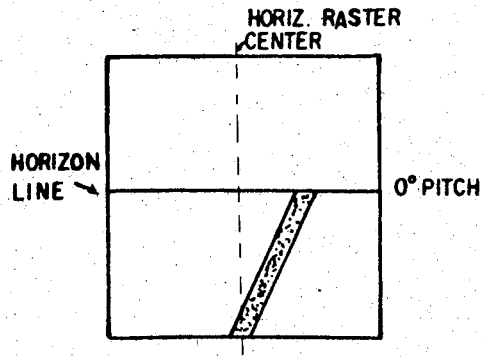
FIGS. 2A–2E illustrate typical course center line displays for different horizontal situations provided by the circuitry of the present invention.

With reference now to FIG. 1A, the display presentation provided according to the novel concepts of the invention set forth in the copending application are shown thereat. The information content of the display unit, which is intended to replace or supplement both the course indicator and flight director used in commercial airlines, provides information including both electronically generated symbology which is displayed on the face of the cathode ray tube as well as discrete information in the form of numerical readouts to thereby provide a more flexible system capable of providing a substantially increased amount of information in a single display which is more nearly related to the real world.

The basic display 48 is shown in FIG. 1A. the identifying numerals used in the copending application have been retained in the drawings to facilitate cross reference, if desired. As shown in FIG. 1A the presentation 48 includes a distinct horizon line 50, a sky plane 52, and a ground plane 54 which is shaded to simulate depth perspective. (The ground shading has not been shown in the drawings because of the difficulties involved in including such showing). Superimposed uopn the basic background 50, 52, 54, are information cues which may be basically categorized as attitude displacement and command information. More specifically, as shown in FIG. 1A, a fixed reference reticle or symbol 56 located in the approximate center of the display provides a fixed reference marking for the aircraft's horizontal and vertical axis. The aircraft reference 56 is comparable in size and shape with a flight command symbol 58 which will be described more fully hereinafter.

The display 48 further includes reference pitch lines 60 which will be generated through an elevation angle of plus-minus sixty degrees. Major pitch lines which also function as a horizontal reference will appear at plus-minus thirty degrees and plus-minus sixty degrees and will be coded to provide positive identification. Incremental pitch lines are provided at 5° and 10° in order to enhance pilot recognition of pitch up or pitch down attitude, the lines below the horizon being white and the pitch lines above the horizon being black.

Movement or displacement of the aircraft about its roll axes is indicated on the display by means of a roll scale 62 in conjunction with a roll pointer 64, the roll pointer 64 enabling the pilot to ascertain in actual degrees the amount of displacement of the aircraft about the roll axes. The indication of rotation displacement of the aircraft about its roll axes is also provided by rotation of the horizon line 50 with reference to the fixed aircraft reticle 56, such displacement providing an indication and approximation of the degree of roll without the preciseness achieved by the roll scale and pointer.

It will be recognized from the foregoing description that the attitude representation provided by the sky, horizon, ground portions 52, 50, 54, the pitch information provided by pitch lines 60, the roll information provided by the roll scale 62 and pointer 64, all of which are viewed with reference to a fixed reticle 56, comprise the information presented by the known types of electromechanical flight directors. The command information normally presented by known flight directors by means of command bars appears in the present display as a flight command symbol 58 which comprises a bright white inverted T which is utilized to present roll, pitch and yaw commands. The command is indicated by the positioning of the flight command symbol in the required roll, pitch or yaw attitudes independent of the remainder of the display. The pilot upon viewing movement of the command must respond by flying the fixed aircraft symbol 56 in such manner as to superimpose the symbol 56 upon the flight command symbol 58.

The fight command symbol is capable of showing 360 degrees of roll command. the pitch and yaw commands are constrained such that the command symbol will always remain within the viewing window. The pitch will be limited to plus and minus ten degrees from existing aircraft pitch angle, and the yaw command range will be limited to plus and minus ten degrees from existing aircraft heading. Pitch or yaw commands in excess of this range will cause the symbol to move to maximum position of displacement and remain there until the command response reduces the error.

Heading and displacement information, such as glide slope deviation, course deviation, and the like, which are presented by the course indicator in prior art systems are also included on the display.

The azimuth heading which is provided by the azimuth card on the known mechanical units, is presented in display 48 as a moving tape 68 which extends along the horizon line 50, the digital representation which appears at the vertical lubber mark 70 serving as a reference for instantaneous aircraft heading. Turning of the aircraft or "change in aircraft heading" results in displacement of the tape along the horizon to bring correspondingly different numerals into view. The numerals are presented at ten degree intervals, the ten degree intervals in turn being subdivided by index marks at two degree intervals.

Horizontal situation information is also achieved by a course centerline 72 which provides a representation of the aircraft instantaneous displacement from a localizer course or a selected VOR radial and is presented in the display 48 as a dashed line 72 which extends from the bottom of the display to the horizon 50.

The near end of the course centerline 72 represents course deviation from the VOR/LOC beam, the degree of which is indicated by a calibrated scale 74 at the lower edge of the display. The electronically-generated scale 74 at the bottom of the display screen when utilizing ILS has a full scale range of plus-minus 2.5 degrees with incremental marks every 1.25 degrees. The position of the far end of the course centerline 72 is determined by the course dialed into the system by the Course Select Knob 76, the range of movement of the far end of the course centerline being limited to plus-minus 15 degrees from the aircraft heading.

The course centerline 72 in the embodiment shown in the copending application also provides command throttle to the pilot, movement of the centerline dashed blocks 75 being effected toward the bottom of the display to indicate decreased throttle and toward the horizon line to indicate increased throttle. Thus, in responding the pilot moves the throttle in the same direction as the motion of the symbology. As the throttle is moved to the proper position, movement of the blocks 75 will terminate.

It will be seen from the foregoing description that the information previously provided by the horizontal situation indicator and flight director indicator in conventional aircraft is now included in an integrated display in a less confusing pattern which has a closer relation to the real world. In addition, display 48 further incorporates a three dimensional perspective presentation which is not achievable by indications on a dial indicator, and includes a centerline which is displaced at both the far and near ends to provide two different sets of information (i.e., as compared to the lateral elevation only of the vertical bar in the known mechanical units).

The display further incorporates a touchdown area which initially appears at the horizon as a wide, white ribbon 80 at such time as the touchdown area is first within range. As the aircraft continues its approach, the ribbon will move down the screen in a continuously lengthening manner. As the ribbon reaches the bottom of the screen, the pilot knows that the touchdown area has been reached. In the display of the copending application, the course centerline 72 is changed from white to black in the ribbon area of the display to provide improved viewing conditions. However in the simplified showing of the present invention, an unbroken dark centerline is provided and the runway as provided is white.

The novel display also includes numerous other information sets which are normally difficult to integrate into a single presentation. Thus, as shown in FIG. 1A, radar altitude is provided in the same display by means of a numeric ribbon scale 82 located at the right hand side of the display, the scale in the presentation shown in FIG. 1A extending from 0–1500 feet. The major portion of the scale will be a linear presentation of altitude from 0–300 feet with indices presented at intervals of twenty feet.

Two index markers 86, 88 located in the left hand portion of the ground texture display are used to compare the captain's compass with the flight officer's compass. The white index indicates the compass heading of the captain's instrument, and the black index represents the compass heading of the flight officer's instrument. If there is no error, the two markers will be vertically aligned. Any error will cause the flight officer index to move horizontally, and the amount and direction of an error can be determined by using the azimuth heading scale 68 as a reference.

A glide slope deviation scale 89 provides information analogous to that presented on the glide slope indicator of the known horizontal situation indicators, the display basically comprising an electronically generated scale 89 having an associated pointer 91 which is displaced along the scale for different degrees of deviation. The scale has a range of plus-minus ½ degree which is subdivided into ¼ degree increments. The glide slope deviation exceeding one-half degree will cause the pointer to remain at full scale deflection until the error has been reduced. In some embodiments at a given low altitude (i.e., 50 feet, for example), the glide slope deviation information may be removed from the display, or locked at the center position.

A course select knob 76, a heading selector knob 94, a heading digital readout 96, a course digital readout 78, a pair of "TO-FROM" lights 92, 93, and distance measuring indicator 98 are located on the front of the panel, and are operated and used in the conventional mode.

A pitch trim control knob 100 located on the front panel permits the pilot to trim the display between +10 degrees and −5 degrees of the actual pitch angle. Four warning indicators on the front of the panel include a power failure indicator 102 consisting of a mechanical flag which is moved to the off position if power fails for any reason, a command failure indicator 104 which results in the illumination of a red indicator if any input signal to the flight command symbol is disrupted, a glide slope failure indicator 106 which consists of a red indicator which will light if the output signal from the glide slope receiver is disrupted, and a VOR-LOC failure indicator 108 which consists of a red indicator which will light if the output signal from the VOR-LOC receiver is disrupted.

Typical displays presented during operation of aircraft in blind landing approach As will be apparent, there exists in the display all information necessary to inform the pilot as to the extent and mode of operation of the basic aircraft controls including the ailerons, elevators, rudder and throttle to operate the aircraft in accordance with the computed commands as necessary to the proper handling of the aircraft in all modes of the aircraft handling, including take-off, climb, en route, approach/landing, go-around and roll-out taxi situations.

With reference to FIGS. 1B–1F, there is set forth thereat exemplary displays which will be presented to the pilot in a typical ILS approach. Pictorial representations of the horizontal situation of the aircraft is shown above each of the displays, and the attitude of the aircraft is shown below the displays as an aid to the understanding of the information which is provided by each display. By way of further explanation, illustrations of the display which would be presented by a course indicator and flight director are shown adjacent to FIG. 1B for the same conditions of flight and command as are represented by the display in FIG. 1B.

It is assumed that at Position 1 the pilot is departing his final navigational fix, and that the runway heading 252 has been dialed into the equipment by adjustment of course selector knob 76 (FIG. 1A) and the flight director computer has selected course 232 to intercept such heading. (While commercial aircraft include such equipment, not infrequently such intercept course will be provided from the control tower at the airport).

As a result of dialing in the course 252, the far end of the course centerline on the display will be adjusted to the azimuth heading 252 degrees on the compass tape, and the near end of the course centerline will position itself relative to the deviation indicator 74 by a value consistent with the deviation of the aircraft from the selected vector.

With reference to position 1, with the aircraft on heading 242 and approaching the selected vector 252 as shown, the pilot will expect to begin a bank toward the right so as to arrive on the desired course and heading to reach the selected runway.

As shown in the display of FIG. 1B, the near end of the course line indicates a deviation of approximately two degrees from the selected course, and the roll scale at the top indicates a bank of 25 degrees has been initiated. The aircraft at the time of the display in FIG. 1B is on heading 242. The far end of the course centerline is still at 252 and the aircraft is banked to the right and turning into the selected course 252. The displacement of the fixed symbol (black) in a greater bank than the command symbol (white) indicates that the aircraft is banked too far, and the pilot's reaction should be to decrease the right bank until such time as the black symbol coincides with the white symbol. The radar altimeter in FIG. 1B is not displayed since the plane has not descended to below 1500 feet. The glide slope is above the aircraft, as indicated by the white marker adjacent the upper portion of the glide slope deviation scale, and as illustrated by the aircraft position sketch below FIG. 1B.

As the aircraft approaches position 2 the display (FIG. 1C) will be as shown (on course 252, zero bank and on glide slope). The command symbol and the reference aircraft symbol are coincident, and accordingly the pilot is informed that the aircraft is being flown in accordance with the command information.

As the aircraft advances to the position 3, the plane is shown by the display of FIG. 1D to be on glide slope, and the aircraft which is flying heading 242 has a crab correction to the left of ten degrees (the end of the course centerline is on the selected heading of 252 degrees and the heading of the aircraft is 242 degrees as shown by the azimuth tape).

The compass comparator information is removed as the pilot descends to below a certain altitude (1500' in the present embodiment) so that information to be observed on the display during the critical moments of landing is reduced. It is also apparent that the radar altimeter now appears on the display and the far end of the course centerline is white to indicate that the end of the runway or touchdown areas is coming into view.

As the aircraft moves to position 4, the radar altitude as shown in FIG. 1E is ninety feet, and the aircraft is on glide slope, but not yet over the touchdown point. The incremental pitch lines have also been removed at this time to reduce clutter and simplify the presentation. The primary cue consisting of the horizon line will produce sufficient indication of the pitch at this time. As shown, the touch down point has advanced farther down the display.

As the aircraft reaches position 5, the aircraft is over the touchdown point and in the landing attitude, and the flight command symbol has been moved laterally to the right calling for right rudder. Since the altitude is very low at this time, the glide slope information has also been removed. The pilot's response to such command is to apply right rudder to reestablish coincidence between the black reference vertical and the white command symbol. At this time, the aircraft should make contact with the ground.

Course centerline

Figure 4:
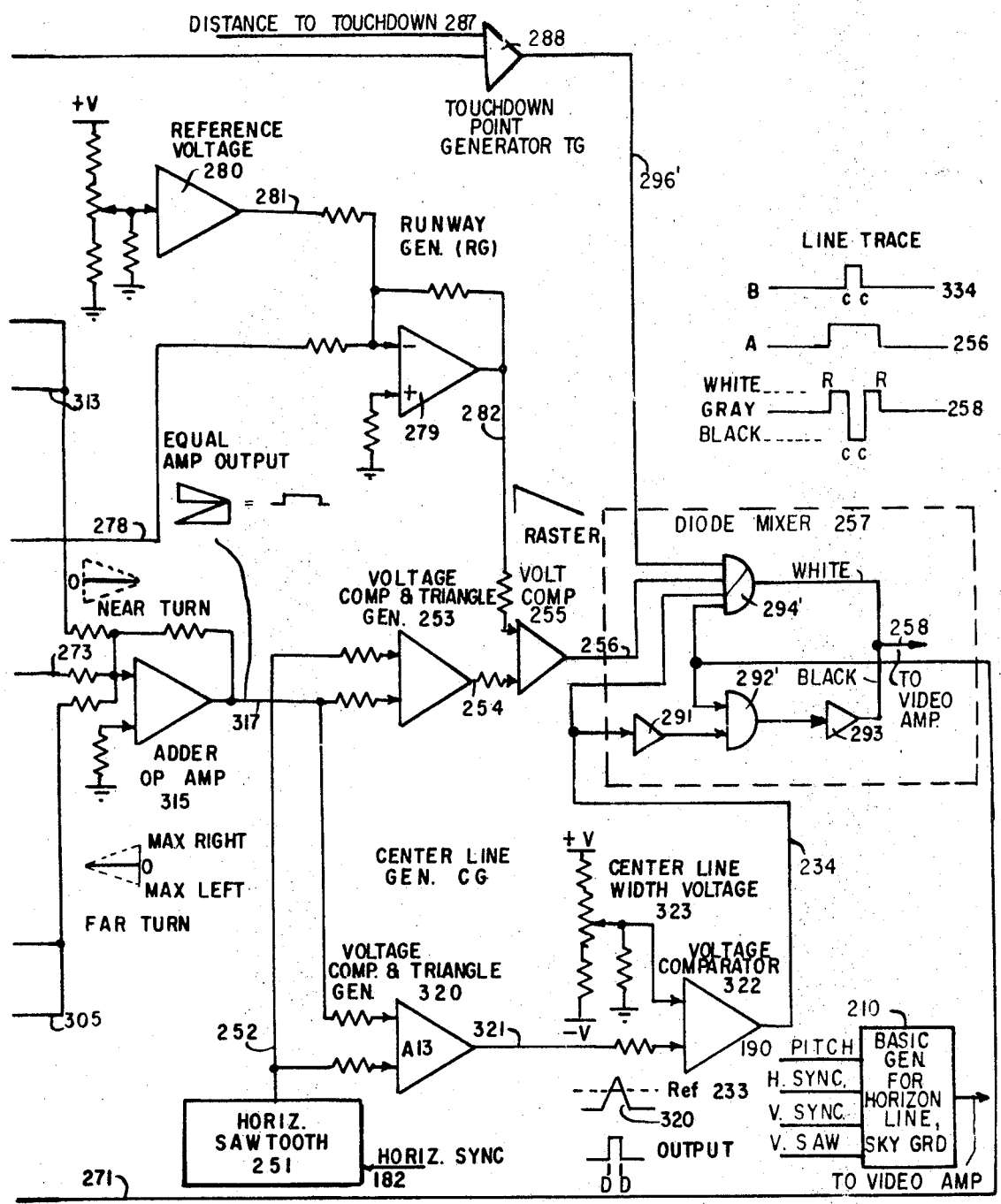

The course centerline generator 250 which generates the course centerline 72 with runway background 73 on the display (FIG. 1A) is shown in detail in FIGS. 3, 4 and 7. As shown in FIG. 3, a first input circuit is connected over conductor 196 to receive a VOR/LOC displacement signal, a second input is connected over conductor 194 to receive a course error signal, a third input is connected over conductor 190 to receive pitch indication signals, a fourth input is connected over conductor 191 to a horizon line generator circuit, a fifth input circuit is connected over conductor 184 to the vertical sync signals output from a timer generator (not shown) which generates the raster on the display, and a sixth input circuit is connected over conductor 182 (FIG. 4) to the horizontal sync output of the timer generator. The signal output of course centerline generator 250 is connected over conductor 258 to a video amplifier for coupling to the display means.

The course centerline 72 is generated by the circuitry of FIGS. 3 and 4, comprises an unbroken dark line which extends from the horizon to the base of the display and which is adjusted to different display positions for different VOR/LOC and course error signal and pitch signal inputs. A runway portion which is comprised of a solid white portion with the course line as the centerline, as shown, has edges which taper inwardly from the base to the horizon to provide an appearance of perspective in the display. In the modification shown in copending application, filed Oct. 10, 1966, as the aircraft approaches a touchdown position (as in an ILS approach), the runway background is continually shown in a dark pattern and the centerline is white. As a touchdown point approaches, the runway changes to white and the centerline becomes darkened.

As will be shown, the far end of the course centerline 72 is displaced laterally from the center by an amount which is proportional to the value of the course error signal provided over conductor 194. The near end of the course centerline 72 is displaced laterally from the center position to different positions as a function of the displacement of the aircraft from the localizer beam which is indicated by the value of the VOR/LOC displacement signal received over conductor 196.

The course centerline generator CG is synchronized in its operation with the raster on the display by the vertical sync signals received over conductor 184 from the timer generator. The generation of the far end of the course centerline, as will be apparent from FIGS. 1A–1F, is tied to the horizon line generation, the signals for effecting such manner of generation being provided over input conductor 191. Pitch signals input over conductor 190 are utilized to maintain the far end and near end of the path at the same lateral displacements (X coordinate) at both the horizon line and bottom marginal edge even though changes in pitch of the aircraft are experienced. As will be shown, if the line is to be maintained at the "X" coordinate on the horizon line (and the bottom marginal edge) with changes in the aircraft pitch attitude, the slope of the course centerline must necessarily be adjusted to compensate for these changes.

Motion display requirements

The generating circuit for the course centerline is shown in detail in FIGS. 3 and 4. However, the purpose and operation of the circuit is perhaps best understood by first considering the motion requirements imposed upon the circuitry in the provision of the desired course centerline, reference being made to FIGS. 2A–2E for such consideration.

With reference, first, to FIG. 2A, there is illustrated thereat in an abbreviated showing, the manner in which the course centerline must be competent to pivot about a point which intersects the bottom of the screen, in response to receipt of a course error signal indicating a difference between the aircraft heading and selected course (assuming zero for the near end and zero pitch).

Figure 2B:
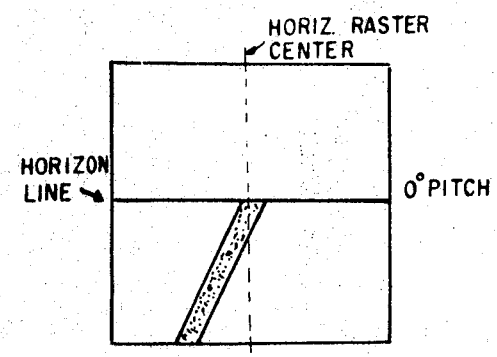

In a similar manner with reference to FIG. 2B, with the receipt of a signal indicating a VOR/LOC displacement (assuming zero input for the far end and zero pitch) the near end of the centerline must pivot about a point at the horizon line. Assuming that the inputs for the far end and the near end illustrated in FIGS. 2A and 2B are applied simultaneously at zero pitch conditions, the course centerline must be displayed as shown typically in FIG. 2C.

Figure 2C:
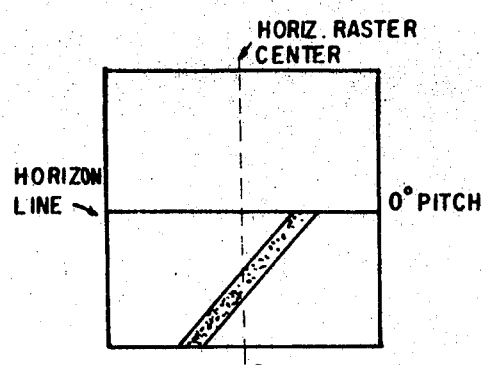
Figure 2D:
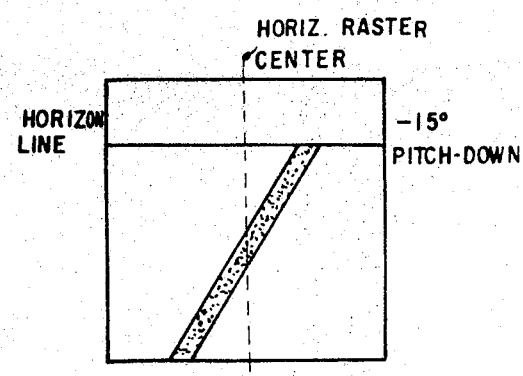
Figure 2E:
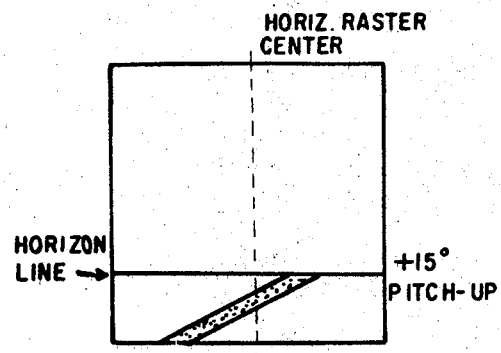

In a similar manner, assuming changing pitch conditions, and assuming the same input signals for the far end and near end, the point at which the course centerline intersects the horizon line and bottom of the screen must remain at the same lateral distance from the display zero reference point. Thus, for example, with a pitch down condition and the same VOR/LOC and course error signals assumed in FIG. 2C, the course centerline must be generated to appear on the display as shown in FIG. 2D. With a pitch-up condition, and the input signals assumed in FIG. 2C the display must appear as in FIG. 2E.

It will be apparent with reference to these figures that the slope of the course centerline must change with the pitch; however, the position of intersection of the course centerline with the horizon line and the bottom of the display must remain at a fixed distance from the zero reference or horizontal display center. The foregoing examples are representative of only a few of an infinite number of displays which the system must achieve in response to variation of pitch, course error and VOR/LOC conditions, and are indicative of the vast flexibility required of the system in the presentation of the far turn and near turn information required in an integrated display.

Specific course centerline circuitry

With reference now to FIGS. 3 and 4 the circuitry capable of achieving the display of a course centerline with these motion requirements is set forth thereat. In describing the circuit operation, reference will first be made to the manner in which a centerline generator circuit CG (FIG. 4) will effect the generation of the centerline with the far end and near end located at the display center (i.e., extending from the horizon vertically down to the base of the display, as shown in FIG. 1C, for example). Thereafter the runway generator circuitry RG for generating the background or runway portion 73 of the course centerline is described, and subsequently the circuitry for effecting adjustment of the near end and far end of the centerline and runway to conditions related to the input signals received over near turn and far turn conductors 194, 196 will be set forth.

Centerline generator CG

With reference to FIGS. 3 and 4, the circuitry for generating the basic centerline is shown to include a horizontal sawtooth generator 251, the frequency of operation of which is controlled by input signals over the horizontal sync conductor 182 from the timer generator to provide a horizontal sawtooth at the frequency rate of 15.75 kc. over output conductor 252. The output of the sawtooth generator 251 is extended over conductor 252 to voltage comparator and triangle generators 253 and 320 for the purpose of establishing a reference waveform of changing value during the successive line traces in the raster.

Figure 2F:
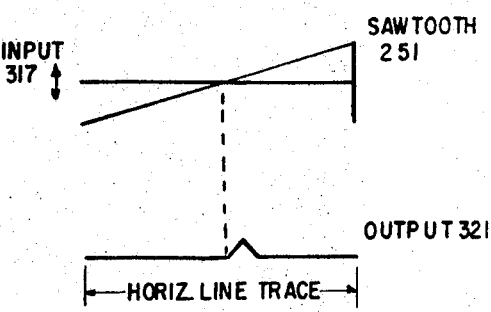
FIG. 2F illustrates waveforms provided by the circuitry in the course line generator in various phases of its operation.

With reference to FIG. 2F a positive-going sawtooth 251 is provided over conductor 252 (FIG. 4) to one input of the voltage comparator and triangle generator 320 during each line trace of the raster, the duration of the sawtooth being the same as the duration of each line trace. A second signal input for circuit 320 receives a signal over conductor 317 from the centerline positioning circuitry in FIG. 3, the value of such signal indicating the time during a line trace at which the course centerline is to be generated, different value signals resulting in a corresponding variation of the location of the course centerline portion in the line being traced.

Thus with reference to FIG. 2F, as the signal on conductor 317 representing the course centerline position for a line being traced is exceeded by the sawtooth voltage at the approximate center of the line trace, the triangle generator 320 is operative to provide an output triangle waveform over conductor 321. Adjustment of the reference voltage 317 to different values in different lines will obviously result in the displacement of the time of generation of the triangle in a raster line trace laterally to either side of the center position shown. Thus a lower value reference signal on conductor 317 will result in the earlier occurrence of a triangle in a line trace, and a larger value reference signal will result in the generation of the triangle at a later point in a line trace.

The comparators, such as 322, may in their simplest configuration comprise a semiconductor switching device normally biassed by reference voltage such as 323 to conduct and biassed to cutoff as the input over conductor 321 exceeds such bias. The signal output during the period of cutoff will be a rectangular pulse as shown, the width of which varies with the width of the triangle waveform input at the level of the reference voltage. Thus, the width of the output pulse is variable by adjustment of the reference voltage 323.

Manifestly if a triangle portion of the same base width occurs at the same time in each successive line trace in the raster, a vertical centerline will be drawn. If the triangle is generated in each line trace at the time indicated in FIG. 2F, the vetrical line will occur in the middle of the display as shown in FIG. 2C. If the reference voltage provided by centerline width voltage source 323 is changed to vary the size of the triangle base which is effective, the width of the centerline will be correspondingly changed.

The value of the signal on conductor 317 during each line trace will be determined by the near end, far end and pitch signals input to the circuitry in FIG. 3 as will be described in more detail hereinafter. As will be shown, such signals will effect trace of the line through "X" coordinates which represent the course error signal and the VOR/LOC signal, and additionally to provide the line through such coordinate even with changes in pitch of the aircraft and corresponding vertical displacement of the horizon line.

Runway generator RG

The circuitry for providing the runway portion of the course centerline comprises a voltage comparator and triangle generator 253 which is operated in like manner by signals on conductor 252, 317 to provide a triangle waveform output on conductor 254 which moves laterally to different positions on the line for different near turn, far turn input signals.

The runway generator further includes an operational amplifier 279 which has a fixed amplitude sawtooth input over conductor 278 at the vertical trace rate of 60 cycles per second, and a reference voltage 280 which is preset in accordance with the value of the runway width to be provided. The output of operational amplifier 279 is effectively (with respect to 15.75 kc. triangle pulse repetition rate) a variable DC 60 c.p.s. sawtooth signal which is inverted relative to the fixed amplitude sawtooth input to amplifier 279 and referenced to runway width voltage 280. Such output signal is compared in voltage comparator 255 with the triangle waveform input over conductor 254 from the voltage comparator and triangle generator 253.

It will be seen from the representative waveforms shown adjacent the output of voltage comparator 255 (assuming a raster trace from bottom to top) that the fixed amplitude sawtooth has its largest value at the bottom of the trace, and will therefore effect conduction by the voltage comparator 255 at a correspondingly earlier period in the initial line traces of the raster. As a result the triangle input over conductor 254 to comparator 255 in the first line trace of a raster will appear at the output 256 as a pulse of relatively wider dimension. As the raster trace progresses upwardly and the voltage of the sawtooth progressively decreases, the voltage comparator 255 is conductive at successively later intervals in the line trace, and a correspondingly smaller portion of the triangle apex is amplified and appears on conductor 256 as a pulse of correspondingly reduced length.

As a result the runway portion narrows as the raster trace proceeds from the bottom toward the horizon (see FIG. 1A for example) to provide an appearance of perspective on the display. Since the sawtooth input to comparator 255 is of fixed amplitude (and variable slope for changing pitch) the runway background if traced to the bottom of the display would always be of the same width at the bottom line trace. Variation of the reference voltage 280 varies the width of the runway.

The resultant signals on conductor 256 are coupled to one input of AND gate 294' in diode mixer 257. A second input of AND gate 294' is connected over conductor 296' to the output of touchdown point generator TG, and a third input is connected over conductor 271 to the horizon line and raster start indicator flip-flop, and a fourth input of AND gate 294' is supplied by centerline signals on conductor 234. The output of gate 294' is fed over conductor 258 to the video amplifier.

The signal output of the course centerline generator CG on conductor 234, as fed over inverter 291, is also fed to AND gate 292' and over inverter 293 and output conductor 258 to the video amplifier. The signals input over conductor 256 to diode mixer 257 provide a white video output during the period RR of the line trace, which period is determined by the width of the pulse output from voltage comparator 255. The signals on conductor 234 output from centerline generator CG as fed to diode mixer 257 result in black video output DD, the duration of which is related to the width of the pulse output from voltage comparator 322.

The manner in which the centerline generator CG and the runway generator RG are tied to the horizon generator to maintain the far end of the course line at the horizon, and the manner in which variable signal inputs are generated for transmission over conductor 317 to provide shifting of the near end and far end of the course centerline with change in VOR/LOC and course error signals, and the manner in which the slope of the sawtooth input to the runway generator is changed to maintain the course line at the same "X" coordinates with changes in pitch and constant course error and VOR/LOC inputs will now be set forth.

At the start of each raster trace, an input signal over conductor 271 is fed to AND gate 292' with the inverted course centerline signals output from inverter 291. A typical output signal for each line trace is shown as waveform B (FIG. 4) it being recalled that the position of the pulse on a line is adjusted laterally by the input signals on conductor 317 from the positioning circuitry of FIG. 3. The width of the pulse is determined by the reference source 323. The output signal of AND gate 292' is inverted by inverter 293 to provide a black level output signal for the course centerline as shown in waveform C. At the receipt of the signal indicating the horizon line trace, the gate 292' is cut off to prevent conduction of the centerline signals over conductor 258 to the video amplifier.

The signal output of AND gate 294' occurs only when a signal is received from the touchdown generator TG (input 1), during the portion of the raster trace which occurs between the bottom raster edge and the horizon line (input 3), and during the period that the runway is to be generated on each line trace of such raster segment (input 2). The variable signal output provided by the positioning circuitry (FIG. 3) over conductor 317 determines the period during each line for trace of the runway signal. The centerline signal to input 4 is to inhibit generation of runway video coincident with the centerline video to facilitate video mixing. The output of AND gate 294' is at a white level which is fed over conductor 258 to the video amplifier.

Tying of runway generator to horizon

As indicated in FIGS. 2A–2E, the far end of the course centerline and runway are tied to the horizon and moves vertically therewith. Such relationship is achieved by synchronizing the generation of the fixed amplitude sawtooth (which is provided over conductor 278 by generator 272—FIG. 3 to the runway generator RG—FIG. 4) to the horizon line and the bottom of the raster trace. As shown by the waveform adjacent conductor 282, the sawtooth is inverted in amplifier 279 so that the maximum value of the sawtooth occurs at the bottom of the trace and the value decreases progressively until the trace of the horizon line occurs.

The fixed amplitude sawtooth generator circuit 272 (FIG. 3) includes a first input 277 over which DC signals variable in value with pitch are received, a second input circuit 275 over which a fixed DC reference voltage is received, and a third input circuit 271 over which signals indicating the start of the raster trace and the trace of the horizon line are provided.

The horizon line sync signal on conductor 271 is provided by a flip-flop 270 which has inputs connected to the horizon line sync pulse conductor 191 and to the vertical sync pulse conductor 184 from the timing generator. The flip-flop 270 is shifted from its first or normal condition with the receipt of the vertical sync pulse over conductor 184 at the start of the raster trace, and remains in such state until receipt of the horizon line sync pulse over conductor 191. The output waveform provided by flip-flop 270 in each raster trace is shown adjacent to the output conductor 271, the extreme ends of such waveform representing the start and end of each raster trace. As the first segement of the waveform is fed over the input circuit 271, fixed amplitude sawtooth genertor 272 initiates generation of the sawtooth (assuming a raster trace from the bottom to top of the display) which continues until generation of the positive-going portion of the input waveform on conductor 271 at the time of the horizon line sync. The sawtooth generator 272 as shown provides a waveform having a positive-going leading edge followed by a rapid retrace at the horizon line. As will be described in more detail hereinafter, signals variable with pitch of the aircraft are fed over conductor 190, isolation amplifier 276 and conductor 277 to the fixed amplitude sawtooth generator 272 for the purpose of modifying the charging rate of the capacitor which determines the slope of the sawtooth output in such manner that the generated sawtooth will always have a fixed amplitude regardless of the sawtooth duration (which changes with the pitchangle of the aircraft). Stated in another manner, the sawtooth must have a fixed amplitude and yet must occur between the start of the raster trace and the time of generation of the horizon line (which changes in position with changes in pitch). With reference to the waveform adjacent conductor 278 the point of occurrence of the trailing edge of the sawtooth identified by "$H_L$" must be laterally displaced in time to the left or right as indicated. If the aircraft pitches down, the horizon line $H_L$ occurs at a later time in the raster trace and the charging rate must be decreased so that the slope of the sawtooth is of a more gentle slope. Alternatively if the aircraft pitches up, the charging rate must be increased so that a sawtooth having an increased slope is provided. The net effect of varying duration and inversely varying charge rate is the constant amplitude sawtooth.

The resultant sawtooth which is of variable slope with changing pitch (but always of a fixed amplitude, which amplitude is determined by the value of the fixed reference voltage 274 provided over input 275) is fed over conductor 278 to the amplifier 279 in the runway generarator circuit RG. The changing slope of the sawtooth for the different pitch conditions of the aircraft as fed to the runway generator RG results in corresponding variation in runway perspective for various pitch attitudes.

The fixed amplitude sawtooth is also fed to operational amplifier 312, 314 in the near end, far end generator circuitry for the course centerline as will be shown.

Lateral displacement of near end and far end course centerline

The circuitry thus far described effects generation of the course centerline and runway background, the course centerline as generated by the course centerline generator CG in the present embodiment with no error signal input comprising a black vertical line which extends from the horizon to the lower marginal edge at the approximate vertical center of the display (see FIG. 1C for example) and the runway provided by runway generator RG comprising a white wedge shaped runway having an apex tied to the horizon, and a base which moves toward the bottom marginal edge of the display as the aircraft approaches the touchdown point. The slope of the runway and the centerline are varied so that with adjustment of the horizon line as a result of changing pitch attitudes of the aircraft, the near end and far end are yet positioned at the same horizontal (X) coordinates. The manner in which the circuitry is operative to adjust the near end and the far end of the course centerline and runway to different positions with the receipt of different course error and VOR/LOC signals is now set forth.

With receipt of course error signals over far turn conductor 194 indicating the extent of difference between the heading of the aircraft and the selected course, the far end of the course centerline must be displaced laterally by a corresponding amount and in a related direction. With displacement of the aircraft from the path designated by the VOR/LOC equipment, the near end of the course line must be displaced by a corresponding inteval and in a related direction. As noted above, with changes in pitch (and assuming no changes in the far turn and near end input signals) the course centerline must intersect the horizon line and the bottom marginal edge at exactly the same horizontal coordinate.

In accomplishing such manner of operation, course error signals are fed over conductor 194 to a far turn channel FTC which includes a substractor operational amplifier 300, a variable sawtooth genertor 302 and a subtractor operational amplifier 314. The VOR/LOC displacement signals are fed over conductor 196 to a near turn channel NTC which includes a subtractor operational amplifier 306, a variable amplitude sawtooh generator 310 and a subtractor operational amplifier 312. The outputs of both channels are referenced to a fixed voltage output from source 273 and fed over adder operational amplifier 315 to the Runway Generator Circuit RG and the Centerline Generator Circuit CG to effect a corresponding adjustment in the position and slope of the runway and course centerline. The nature of the signals provided, the mode of operation, and the resultant display are now set forth.

Far turn channel

As noted above, the far turn channel includes a subtractor operational amplifier 300 having a first input connected to conductor 194 to receive the course error signals, and a second input circuit connected over conductor 275 to the reference voltage source 274. The input signals received over course error conductor 194 comprises a variable DS signal from the course error sensor equipment on the aircraft. The operational amplifier 300 generates a signal corresponding to $[A_3(E_B-E_F)]$ where $E_B$ is the reference signal, $E_F$ is the course error signal and $A_3$ represents the amplifier characteristic of operational amplifier 300. The value of the amplified course error signal determines the amplitude of the sawtooth to be generated by generator 302, different values of the error signal resulting in sawtooth waveforms of different amplitudes.

The amplfied output of the operational amplifier 300 is fed over conductor 301 to the variable amplitude sawtooth generator 302 which is operative at the vertical trace rate of the raster (60 cycle/sec.). The saw tooth generator 302 includes a second input circuit connected over conductor 271 to the flip-flop 270 which, it will be recalled, provides a first signal (negative) during the period of the generation of the ground portion of the raster display (assuming trace from bottom to top of the raster), and a second signal (positive) with generation of the horizon line and sky portion of the display. Sawtooth generation by generator 302 is initiated with recepit of the leading edge of the first signal (i.e., at the start of the raster trace). A third input circuit connected with conductor 277 provides signals to the sawtooth generator 302 which vary with the pitch of the aircraft (i.e., from isolation amplifier 276 and pitch input 190). As will be shown in more detail hereinafter, the pitch input over conductor 190 results in modification of the slope of the sawtooth output but does not vary the sawtooth amplitude—the amplitude output by generator 302 is varied only as a function of the course error signal input over path 301.

The resultant variable amplitude sawtooth output on conductor 303 is referenced to the fixed amplitude sawtooth output from generator 272 in subtractor operational amplifier 314. By way of example, for zero far turn input, the variable amplitude sawtooth of sawtooth generator 302 (the amplitude of which is determined by the course error signal input over conductor 194) will be equal to that of the fixed amplitude sawtooth waveform which is output from sawtooth generator 272. For a positive or negative far-turn input over conductor 194, the amplitude of the variable sawtooth output from generator 302 will be greater or less than that of the fixed sawtooth.

Since the duration of both the variable and fixed sawtooth are tied to the bottom of the raster and the horizon line (i.e., both are generated as a function of pitch), both sawtooth generators 272 and 302 must have the capability of adjusting the charging rate and waveform slope for different pitch conditions. The circuitry which effects such manner of operation is shown in FIG. 7 and will be described more fully hereinafter.

With reference to FIGS. 5C–5D, there are shown thereat exemplary waveforms which are provided by the sawtooth generator 272 and the variable sawtooth generator 302 for a zero pitch condition, as referenced to the system vertical sync signal (FIG. 5A) and the signal output of the horizon line flip-flop 270 (FIG. 5B). In the illustration of FIG. 5B, it will be apparent that the vertical wavefront edge H1 (which occurs as the horizon line is traced) indicates a horizon line at the approximate center of the raster (i.e. zero pitch condition of the aircraft). With display of the horizon line closer to the bottom marginal edge of the raster as the result of a pitch-up condition, the vertical front H1 of the waveform will be moved to the left, and with a pitch-down condition (the horizon line closer to the top of the display) the vertical front H1 will be moved towards the right.

As shown in the zero pitch display of FIGS. 5C and 5D, the waveform output of the fixed amplitude sawtooth generator 272 and the variable amplitude sawtooth generator 302 are of equal amplitude and have like slopes. Further, the vertical trailing edge of the sawtooth occurs at the time of the horizon line trace. As indicated, the output of the fixed sawtooth generator 272 is basically determined by the value of the reference voltage $E_B$ as output from source 274, and the amplitude of the variable sawtooth generator 302 is determined by the value of fixed reference voltage $E_B$ and the input signal $E_F$ which indicates the value of the course error.

The fixed amplitude sawtooth is shown once more in FIG. 6A, for reference to the variable amplitude output of the far turn generator 302 in FIG. 6B. As there shown the variable sawtooth varies with respect to the fixed amplitude sawtooth for changing course error signal, the solid line representing the sawtooth for $E_F=0$ (zero course error) and the dotted lines $E_F$ MIN and $E_F$ MAX representing the amplitude or variations for course error signals in both directions from zero. With reference to FIGS. 6C, the waveform output from the subtractor amplifier 314 responsive to the inputs of FIGS. 6A, 6B from generators 272, 202 is shown thereat. As illustrated with zero course error signal ($E_F=0$) zero output is provided, and with variation of the value of the course error signal showing an error in one direction ($E_F$ MIN), a positive going sawtooth of related amplitude is provided and with a course error signal showing error in the opposite direction ($E_F$ MAX) a negative going signal is provided.

With reference to FIGS. 5E–5G, it will be apparent that with a pitch-up condition (display of the horizon line closer to the lower marginal edge of the display as shown by line H1), the amplitude of the sawtooth output from the fixed amplitude sawtooth generator 272 remains the same, but the slope of the sawtooth has been changed so that generation of the sawtooth occurs in the shorter period required for the raster trace to advance to the point at which the horizon line is traced ($V_S$ to $H_L$). The sawtooth output from the variable sawtooth generator is shown in FIG. 5G to have the same amplitude as the fixed sawtooth (i.e., zero course error signal input over conductor 194) and the slope is changed as in the case of the fixed sawtooth so that the trailing edge of both sawtooths occurs simultaneously with the horizon line trace (H1) on the display. In this example, with the sawtooths of FIGS. 5F, 5G fed to subtractor 314, the output therein will be $E_F=0$ (FIG. 6C).

Referring now to FIGS. 5H–5J, the waveform outputs of the fixed waveform generator 272 and variable sawtooth generator 302 for a pitch-down condition are shown thereat. In such event, the horizon line is drawn closer to the upper marginal edge of the display, and accordingly the charging rate of the fixed sawtooth generator 272 and variable sawtooth generator 302 have been decreased so that a more gentle slope for the sawtooth waveforms output therefrom is provided. The amplitude of the sawtooth output from fixed amplitude generator 272 is, of course, always the same. However, assuming for exemplary purposes that a course error signal is received over conductor 194, indicating the selected course as being to the right of the aircraft heading, the amplitude of the variable sawtooth output from generator 302 is increased by an amount related to the value of the course error signal (FIG. 5J) and as a result with the two sawtooths shown in FIGS. 5I, 5J input to subtractor 314, the output will be represented by the upper line of FIG. 6C. With such waveform output the far end of the course centerline will occur later in the horizon line trace (i.e., will be moved to the right of the display center). It is apparent that a signal output from variable sawtooth generator 320 of less amplitude than the fixed amplitude signal (see lower waveform, FIG. 6C) would result in corresponding movement of the far end of the course line to the left of the display center.

Near turn channel

In a similar manner, a second or "near turn" channel NTC (FIG. 3) provides a variable sawtooth output to lateral displacement of the near end of the path from the reference center position of the display in response to variations in the VOR/LOC displacement signals input over conductor 196. Such circuitry is very similar to the far turn channel circuitry FTC and basically comprises a subtractor amplifier 306 having a first input circuit connected to the VOR/LOC displacement input 196, and a second input connected to the reference voltage source 274. The output of the subtractor operational amplitude 306 is extended over conductor 307 to a variable amplitude sawtooth generator 310, (which is of the same structure as variable amplitude sawtooth generator 302) and also over 308 to a subtractor operational amplifier 312.

Variable sawtooth generator 310 has a further signal input from the horizon line flip-flop 270 (path 271) and an input from the pitch isolation amplifier 276 (path 277). In response to such inputs, generator 310 provides a sawtooth output in the same manner as generator 302, the amplitude of the sawtooth of the near turn generator 310 varying with the VOR/LOC displacement signals received over conductor 196, and the slope being variable for different pitch conditions, so that the sawtooth amplitude will not change with the changing pitch input.

The signal output of the near turn generator 310 is transmitted over conductor 341 to a subtractor operational amplifier 313. A second input circuit 278 to amplifier 312 provides the fixed amplitude sawtooth from generator 272 thereto for reference purposes, and a third input circuit 308 provides signals representative of the VOR/LOC error signals from operational amplifier 306. The basic difference between channels NTC and FTC is the hinged point location. In channel NTC, the VOR/LOC error signal ($EB-EN$) is added to the variable sawtooth to effect a DC level shift.

The outputs of the variable sawtooth generator 310, the operational amplifier 306, and the fixed reference sawtooth output from generator 272 are algebraically summed by the subtractor operational amplifier 312 to produce a bi-polar sawtooth, the magnitude of the bi-polar sawtooth being a direct function of the value of the near turn signal error input over conductor 194.

With reference to FIGS. 6D, 6E, the range of waveform outputs of the fixed generator 272 and the near turn generator 310 are shown thereat. Briefly the waveform output 278 of fixed generator 272 is shown in FIG. 6A. With zero VOR/LOC displacement signal input, the output of the variable generator 310 will be as shown by the solid line in FIG. 6E which is the same as that of the fixed generator 278 (FIGS. 6D, 6E). With receipt of a VOR/LOC signal indicating an error in one direction a sawtooth is provided from variable generator 310 as indicated by the dotted line $E_N$ MIN. With receipt of a VOR/LOC signal indicating an error in the other direction, the resultant sawtooth output from variable generator 310 will be as indicated by the dotted line $E_N$ maximum.

As stated above, the sawtooth output of near turn channel NTC is coupled over path 341 to subtractor operational amplifier 312 for referencing to the fixed amplitude sawtooth (FIG. 6D) and the output of subtractor operational amplifier 306 to produce bi-polar sawtooths as shown in FIG. 6F. Zero near turn error is illustrated by $E_N=0$. Error in one direction (minimum) results in a negative going sawtooth and effects displacement of the near end of the course line to the right. Error in the other direction (maximum) results in a positive going sawtooth and displacement of the near end of the course line to the left.

The manner in which the different sawtooth waveform outputs from amplifier 312, 314 shown in FIGS. 6C and 6F are obtained may be best illustrated by using exemplary values. If, for example, the fixed amplitude sawtooth has a range from 0 to 10 volts at maximum amplitude, and the variable amplitude sawtooth ranges from 0–10 volts when $E_F=0$, the resultant output from subtractor 314 will be zero (i.e., $E_F=0$—FIG. 6C). Assuming a far turn input signal such as $-5$ volts results in a 0–15 volt sawtooth output from generator 302, the sawtooth output from subtractor 314 when the 0–10 volt fixed amplitude sawtooth is subtracted therefrom will be a 0 to $+5$ volt sawtooth ($E_F$ MIN—FIG. 6C). Assuming a $+5$ volt far turn input signal results in a 0–5 volt sawtooth output from generator 302, the sawtooth output from subtractor 314 when the 0–10 volt fixed sawtooth as subtracted therefrom will be a 0 to $-5$ volt sawtooth ($E_F$ MAX—FIG. 6C). The range of waveforms output from amplifier 305 is also shown in FIG. 4 as input to added amplifier 315.

The waveform output from the near turn channel is obtained in a slightly different manner and results in sawtooth waveforms (FIG. 6F) which are a reversed image of the sawtooth waveform output from the far turn channel (FIG. 6C). In the use of the near turn channel, the subtractor amplifier 312 is fed by the fixed amplitude sawtooth 272 and the variable sawtooth from the near turn generator 310 and also by the near turn DC reference signal on conductor 308. Assuming that a 0 volt near turn input signal on conductor 307 results in a 0–10 volt sawtooth output from near turn sawtooth generator 310, the resultant output from subtractor 312 when compared with the 0–10 volt fixed amplitude sawtooth (and the zero reference on conductor 308) will be zero volts ($E_a=0$, FIG. 6F).

Assuming now that a $-5$ volt input results in a sawtooth of 0 to 15 volts, and the $-5$ volts is coupled to the same terminal of subtractor 313, the sawtooth will now extend from $-5$ to $+10$ volts, and when the fixed amplitude sawtooth (0–10 volts) is subtracted from the $-5$ to $+10$ volt sawtooth in subtractor 312 the sawtooth output will be from $-5$ to 0 volts (the lower line—$E_n$ MAX—FIG. 6F). If a $+5$ volt input results in a sawtooth output from near turn sawtooth generator 310 of 0–5 volts, the $+5$ volts near turn signal on the same terminal results in a $+5$ to $+10$ volt sawtooth input for the upper terminal for subtractor 312. When the 0 to 10 volt fixed amplitude sawtooth is subtracted from the near turn sawtooth in subtractor 312 the resultant sawtooth will be from +5 volts to 0 volts (the upper line—$E_n$ MN—FIG. 6F).

The resultant sawtooth waveform output of the subtractor operational amplifier 312 and the subtractor amplifier 314 are fed to, and algebraically summed by, adder operational amplifier 315 along with a reference voltage input from source 314, the voltage level output therefrom determining the composite direction of the displacement. The amplitude of the output signal P as shown adjacent conductor 317 in FIG. 4 will vary with the amplitude of the near turn and far turn sawtooths, whereby, as will be shown, the lateral position of the vertical line relative to the vertical display center will be correspondingly adjusted.

If the sawtooths are of equal amplitude (course error signal equal to VOR/LOC signal) the output will be DC voltage signal 273 (see waveform P adjacent conductor 317).

If the sawtooths are of different amplitudes, the resultant output will be a composite sawtooth, and the course line and runway background will be presented as a skewed line, which when viewed at the vertical frequency will have a shape similar to the composite sawtooth output of amplifier 315. Stated in another manner the point at which the course line crosses the horizon line is determined by the amplitude of the far turn sawtooth, and the point at which the course line intersects the lower marginal edge of the display is determined by the amplitude of the near turn sawtooth. Together the amplitudes of the sawtooths determine the slope of the course line.

The output of the operational amplifier 315 is fed over conductor 317 to establish a variable reference voltage for the triangle generator pickoff circuits 253 and 320, as initially disclosed and now briefly summarized.

If the amplitudes of the waveforms input to adder 315 are equal as shown by the waveform P adjacent conductor 317 in FIG. 4, a vertical course centerline will be displayed. That is, the output of adder amplifier 315 will be a DC signal of constant value for the duration of the raster trace from the bottom marginal edge to the horizon line, and the centerline generator CG and runway generator RG will provide the indicated video pulse outputs at the selected interval in each horizontal trace below the horizon line; that is, at the interval determined by the time during each line trace that the horizontal sawtooth from source 251 increases to the value of the DC reference signal provided on conductor 317 by the positioning circuits of FIG. 3.

The width of the pulse output from voltage comparator 322 may be adjusted by centerline width potentiometer 323 which, in any event, will be less than the width of the pulse output from voltage comparator 255. As noted earlier, the output pulse of voltage comparator 255 becomes decreasingly narrower during progress of the raster trace from the bottom to the horizon by reason of the sawtooth signal input over conductor 282.

It will be further recalled that in the less complex embodiment shown in FIG. 4, the runway will not normally appear as a black background as shown in FIG. 1A, etc., and will only appear as a white runway when a touchdown signal is provided over "distance-to-touchdown" input 287 for comparison in voltage comparator 288 with the fixed amplitude sawtooth input over conductor 278. The normal signal output of comparator 288 is fed to gate 294' to prevent the signal output from the runway generator RG from passing to the diode and the video amp. As the time of the output signal from comparator 288 increases by reason of the advance of the aircraft toward the touchdown point, the gate 294' is opened at an earlier line trace in the successive raster trace (assuming raster trace from bottom to top) and the runway advances from the horizon line toward the bottom of the display as shown by the white portions of FIGS. 1E, 1F.

The centerline generator output is gated by gate 292' in the raster period extending from the lower marginal edge to the horizon.

The more sophisticated arrangement shown in FIGS. 1A–1F wherein the darkened runway is normally provided, and a change to the white runway is effected to show touchdown is described in the above identified copending application.

The basic cues of the display which include the sky portion 52, horizon 50, and ground texture 54 (FIG. 1A) may be generated by using a basic cue generator 210 which is of the type set forth in Reissue Patent 25,756, which was filed Apr. 11, 1958 and assigned to the assignee of the present invention, specific reference being made to the circuitry shown in FIGS. 12 and 16 of such patent.

In the present arrangement, the basic cue generator 210 (FIG. 4) is controlled by (a) the vertical sawtooth output over conductor Vs from the timer generator circuit for the system at the raster rate, (b) the vertical sync signals input over conductor 184, and (c) the signals indicating the pitch of the aircraft input over conductor 190 from the vertical gyro. As shown in such patent and the above identified copending application, the basic cue generator 210 basically comprises a comparator circuit which compares the changing voltage of the sawtooth (which changes at the raster rate) against the voltage input on pitch conductor 190. The raster trace in the patent disclosure proceeded from top to bottom. Prior to the generation of the horizon line, the clipped portion of the differentiated signal shown in FIG. 16 thereof (the straight line portion which precedes the negative-going pulse) is mixed with the signal output of amplifier circuit 139 to provide a sky portion of relatively light intensity which extends downwardly from the upper margin of the display to the horizon line. As the negative-going portion of the pulse is mixed with the output signal of the amplifier stage 139 to the video amplifier 145, the negative-going pulse effects the trace of dark horizon line across the screen. As the trace approaches the bottom of the raster, the pulse then slowly proceeds in a positive direction and the texture of the ground pattern traced below the horizon line becomes gradually lighter. Thus by adjusting the voltage into the square wave generator 138 to a different value, the trailing edge of the square wave is generated at different time periods relative to the vertical sync pulse which triggers each raster trace, and a corresponding adjustment of the time of trace of the horizon line in the raster. The output signals are provided over conductor 258' to the video amplifier.

Sawtooth generator circuits 302, 310, 372

With reference to FIG. 7, a basic generator circuit SG which may be utilized for the sawtooth generators 302, 310 and 272 of FIGS. 3 and 4 is set forth thereat in detail. As there shown, the sawtooth generator circuit 56 basically comprises an input circuit (275, 307, 301 as the case may be), connected to a differential amplifier 350. A feedback conductor 371 is connected to the second input for the differential amplifier 350 for the purpose of achieving a fixed amplitude output regardless of duty cycle (i.e., period of sawtooth generation). The output voltage of differential amplifier 350 is connected over resistor 351 to the base of transistor 252. The collector of transistor 352 is connected over the resistor 353 to positive potential, and over resistor 354 and diode 355 to the control element 360 which controls the current flow over a charging circuit for capacitor 362 which extends from plus potential over resistor 361, transistor 360, capacitor 362 to negative potential.

The level of the signal coupled to differential amplifier 350 (from input 275, 307 or 301 as the case may be) will determine the degree of conductivity of transistor 360 and thereby the basic charge rate for capacitor 362. A second circuit for further controlling the charge rate includes a transistor 365 which is connected with resistor 366 between positive and negative potential and which has a base element connected to the input conductor 277 (FIG. 3) over which signals indicating the pitch of the aircraft are received. If the aircraft is in a pitch-up attitude (wherein the horizon line will occur at a lower point on the display), the voltage of the signal over input conductor 277 is decreased, and the conductivity of transistor 365 is increased to thereby increase the charge rate over the capacitor 362 with the consequent result that the slope of sawtooth is increased, and the horizon line is traced at an earlier point in the display (see FIGS. 5E–5G). The changing voltage on capacitor 362 appears as an output signal on conductor 367 for amplification by a buffer amplifier 370 and transmission over the output circuit 278, 341, 303 as the case may be. The discharge of the capacitor to provide the trailing edge of the sawtooth is effected by switch 368 which is turned on in response to a signal input over conductor 271 from the horizon line flip-flop circuit 270 (FIG. 3). Thus the trailing edge of the sawtooth is tied to the horizon line trace (and the pitch of the aircraft).

In brief, with the receipt of the vertical sync signal at the start of the raster trace, the initial portion of the waveform received over conductor 271 effects turnoff of the transistor 368, and charging of the capacitor 362 occurs at a rate which is basically determined by the value of the signal on the first input conductor (275, 307, or 301 as the case may be) which charging continues until such time as the vertical edge $H_1$ of such waveform occurs on conductor 271, which edge is coincident with the trace of the horizon line on the display.

The rate of charging in addition to being determined by the level of the input signal on conductor 275, 307 or 301 is also determined by the value of the pitch indicating signal on conductor 277 which varies in value with the pitch attitude of the aircraft. At such time as the vertical edge $H_1$ of the waveform output from flip-flop 270 occurs on conductor 271 during the raster trace, the transistor 368 is turned on and capacitor 362 is discharged to provide the trailing edge of the sawtooth.

It will be seen therefore that with a fixed turn input signal on conductor 275, 307, 301, the slope of the outgoing sawtooth is varied with changes in the pitch input signal while yet maintaining a fixed amplitude sawtooth so that the ends of the course centerline retain the same horizontal coordinates relative to the horizon line and bottom marginal edge of the display. With changes in the turn signal input on conductor 301, 307 the amplitude of the sawtooth output from the associated generator is adjusted to correspondingly vary the position of the horizontal coordinate for the near end or far end of the course line as the case may be.

While what is described is regarded to be a preferred embodiment of the invention, it will be apparent that variations, rearrangements, modifications and changes may be made therein without departing from the scope of the present invention as defined by the appended claims.

We claim:

1. In a system for providing a display on a raster presentation of horizontal situation and attitude information for a mobile unit having motion about several axes, signal generator means for providing a horizon line symbol on said display at different vertical positions for different pitch attitudes of the unit, course line generator means for providing a course line on said display, signal means for providing position signals which indicate the position of said mobile unit relative to a selected course, postioning means for adjusting one end of said course line at least to indicate the error as represented by the position signals including a variable sawtooth generator for generating a sawtooth waveform at the vertical rate of the raster having an amplitude related to the value of said position signals, a fixed sawtooth generator for generating a sawtooth waveform at the vertical rate of the raster having a fixed amplitude, operational amplifier means for providing a bipolar sawtooth signal output, the polarity and amplitude of the sawtooth output being determined by the algebraic sum of said fixed and variable sawtooth waveforms, and means for controlling said course line generator means to position at least said one end of said course line to an X coordinate on said display which is determined by the value of said signal output from said operational amplifier means.

2. A system as set forth in claim 1 in which said operational amplifier means comprises a subtractor operational amplifier for providing said bipolar sawtooth output.

3. A system as set forth in claim 1 in which said signal means provides course error signals, and said signal output resulting from said algebraic sum determines the X coordinate of the far end of said course line on said display.

4. A system as set forth in claim 1 in which said signal means comprises means for providing VOR/LOC signals, and said signal output resulting from said algebraic sum determines the X coordinate of the near end of said course line on said display.

5. A system as set forth in claim 1 which includes ruway generator means for generating a runway on said display, and said last means for controlling said course line generator means is also connected to said runway generator means to determine the X coordinate of at least one end of said runway.

6. A system as set forth in claim 1 in which said variable sawtooth generator includes means responsive to different position signals to generate sawtooth signals which are of the same amplitude, larger amplitude and smaller amplitude than said fixed sawtooth, said fixed and variable sawtooths being of the same duration, and in which said operational means is operative to provide bi-polar sawtooth output with variation in the amplitude of said variable sawtooth above and below the value of said fixed sawtooth.

7. In a system for providing a display on a raster presentation of horizontal situation and attitude information for a mobile unit having motion about several axes, signal generator means for providing a horizon line symbol on said display at different vertical positions for different pitch attitudes of the unit, course line generator means for providing a course line on said display, signal means for providing position signals which indicate the position of said mobile unit relative to a selected course, positioning means for one end of said course line at least including a variable sawtooth generator for generating a sawtooth waveform at the vertical rate of the raster, first input means for said variable sawtooth generator for providing said position signals to said generator to vary the sawtooth amplitude with the value of said position signals, a fixed sawtooth generator for generating a sawtooth waveform at the vertical rate of the raster having a fixed amplitude, a first input means for said fixed sawtooth generator and a second input means for said variable sawtooth generator for providing signals to vary the time period of said fixed and said variable amplitude sawtooth waveforms for different vertical positions of the horizontal line on the display, a second input means for said fixed sawtooth generator and a third input for said variable sawtooth generator for providing signals to vary the slope of said fixed and said variable amplitude sawtooth waveforms for different pitch conditions of the mobile unit means for providing a signal output determined by the algebraic sum of said fixed and variable sawtooth, and means for controlling said course line generator means to position at least said one end of said course line to an X coordinate on said display which is determined by the value of said signal output.

8. In a system for providing a display of horizontal situation and attitude information for a mobile unit having motion about several axes, signal generator means for providing a horizon line symbol including means for vertically adjusting the position of the horizon line on the display for different pitch attitudes of the unit, input means for providing a course error signal, course line generator means for providing a course line on said display, means for positioning one end of said course line at an X coordinate on said horizon line determined by said course error signals comprising a first sawtooth generator for generating a sawtooth waveform having a variable amplitude which is determined by the value of said course error signals, a second sawtooth generator for generating a sawtooth having a fixed amplitude, means for varying the time periods of said fixed and variable amplitude sawtooths with changes in pitch of said mobile unit, means for varying the slope of said fixed and variable sawtooths to reach said fixed amplitude and said variable amplitude determined by said course error signals in the time period provided, means for providing a signal output determined by the algebraic sum of said fixed and variable sawtooth, and means positioning at least said one end of said course line on said horizon line at an X coordinate determined by the value of said signal output.

9. In a system for providing a display of horizontal situation and attitude information for a mobile unit having motion about several axes, signal generator means for providing a horizon line symbol including means for vertically adjusting the position of the horizon line on the display for different pitch attitudes of the unit, input means for providing a VOR/LOC signal, course line generator means for providing a course line on said display, means for positioning one end of said course line at an X coordinate determined by said VOR/LOC signals comprising a first sawtooth generator for generating a sawtooth waveform having a variable amplitude which is determined by the value of said VOR/LOC signals, a second sawtooth generator for generating a sawtooth having a fixed amplitude, means for varying the time periods of said fixed and variable amplitude sawtooths with changes in pitch of said mobile unit, means for varying the slope of said fixed and variable sawtooths to reach said fixed amplitude and said variable amplitude determined by said VOR/LOC signals in the time periods provided, means for providing a signal output determined by the algebraic sum of said fixed and variable sawtooths, and means positioning at least said one end of said course line at an X coordinate on the lower display edge determined by the value of said signal output.

10. In a system for providing a display of horizontal situation for a mobile unit, course line generator means for providing a course line on the display, input means for providing position signals indicating the relative position of the mobile unit to a selected heading, a variable sawtooth generator for generating a sawtooth waveform having an amplitude related to the value of said signals, a fixed amplitude sawtooth generator for generating a sawtooth having a fixed amplitude, control means for varying the time period for said fixed and variable amplitude sawtooths responsive to changes in pitch of the unit, pitch means for varying the slope of said fixed and variable sawtooth to reach said fixed and variable amplitudes in the time period provided by each variation, means for providing an output signal which is the algebraic sum of said fixed and variable sawtooths, and means for controlling said course line generator means to adjust one end of said line to the position indicated by said output signals.

11. A system as set forth in claim 10 in which said fixed amplitude sawtooth generator includes a potential storage means, a charging circuit for said storage means, switch means for enabling said charging circuit at a first rate controlled by said control means, and means for varying said charging rate controlled by said pitch means.

12. A system as set forth in claim 10 in which said variable amplitude sawtooth generator includes potential storage means, a charging circuit for said storage means, switch means for enabling said charging circuit at a rate controlled by said position signals, and second means controlled by said pitch means to further adjust said charging rate.

13. In a system for displaying a course line for a mobile unit, course line generator means for generating a course line on the display, a first input means for providing input signals indicating the Y coordinate of the far end of the line, a second input means for providing position signals indicating the desired X coordinate of the far end of the line, a third input means for providing position signals indicating the desired X coordinate of the near end of the line, waveform generator means responsive to said input signals to provide a sawtooth waveform to control said course line generator means to provide a course line between said X coordinates with the far end at said Y coordinate, and means in said waveform generator means responsive to a change only in the Y coordinate input over said first input means to adjust the slope of said sawtooth waveform to provide a course line between the same X coordinates with the far end at the changed Y coordinate.

14. In a display system for providing the display of information on a raster presentation, course line generator means for providing a reference line on the display having a far end and a near end, far end input means for providing input signals indicating the X coordinate for the far end of said line, a near end input means for providing input signals indicating the X coordinate for the near end of said line, far end variable sawtooth generator means for generating a variable sawtooth waveform at the vertical rate of the raster having an amplitude related to the value of the signal received over said far end input means, near end variable sawtooth generator means for generating a variable sawtooth at the vertical rate of the raster having an amplitude related to the value of said signals received over said near end input means, fixed amplitude generator means for generating a sawtooth at the vertical rate of the raster having a fixed amplitude, input means for providing a start and terminating signal to said fixed amplitude, said far end and said near end sawtooth generator means, a first operational means for algebraically summing the sawtooths provided by said far end sawtooth generator means and said fixed amplitude generator means, a second operational means for algebraically summing said sawtooths provided by said near end generator means and said fixed amplitude generator means, means for combining the signal outputs of said first and second operational means, means responsive to said combined signal output to control said course line generator means in the positioning of the near end and far end of said line on said display at the positions indicated by said input signals, and means for providing signals to vary the slope of said fixed amplitude, said far end and said near end variable sawtooths with changes in pitch of the unit.

15. A display system as set forth in claim 14 which includes runway generator means for providing a runway with said course line on said display, and means responsive to said combined signal output to adjust the output of said runway generator and thereby the position of said runway on said display.

16. In a system for providing a video display of information for a mobile unit having motion about several axes, course line generator means for providing a course line which extends between two points on the display to represent a selected course, means for providing signals indicating proximity of the mobile unit to a selected reference point on said course line, generator means for generating a reference symbol including means responsive to said signals to control display of one end of said symbol in increasing dimensions at progressively advanced positions along said course line to thereby display the approach of the mobile unit toward said selected reference point as the mobile unit advances theretoward.

17. A system as set forth in claim 16 which includes means for generating a horizon line, and in which said generator means are operative to provide a runway display and in which said means in said generator means controls said runway to emanate from said horizon in the direction of the lower marginal edge of the display and to proceed along said course line toward the lower marginal edge as the mobile unit approaches said reference point.

18. A system as set forth in claim 16 in which said unit comprises an aircraft and which includes means for providing a horizon line on said display, and in which said means in said generator means is operative to provide a display of a touchdown point for the aircraft which emanates from said horizon line and moves along said course line toward the end of the display.

19. In a system for providing a video display of information for a mobile unit having motion about several axes, horizon line generator means for providing a horizon line on said display, input means for providing input signals indicating a touchdown reference point for the unit, and runway generator means for providing a runway symbol on said display and means operative responsive to said input signals for effecting the display of a small section of said runway symbol adjacent said horizon line and for increasing the length of said runway symbol from said horizon line toward the bottom of the display as the input signals indicate advancement of the mobile unit toward the touchdown reference point.

20. In a system for providing a video display of information for a mobile unit having motion about several axes, horizon line generator means for providing display of a horizon on said display, course line generator means for providing a course line on the display which extends between a first point on said horizon line and a second point on the display to represent a selected course for the unit, means for providing signals indicating proximity of the unit to a selected reference point, runway generator means for generating a runway on said display having one end which remains fixed at said horizon line and a second end which advances progressively from said horizon line to successive positions along said course line to display the relative distance to said point as the mobile unit advances theretoward, and positioning means for controlling said course line generator means and said runway generator means to adjust the course line and said runway to different positions to indicate the relative position of the mobile unit and course line.

21. In a system for providing a video display of information for an aircraft unit, means for generating a horizon line, course line generator means for providing a course line on the display representative of a selected course, means for providing signals indicating proximity of the unit to a selected touchdown point, further generator means for generating a touchdown mark on said display which emanates from the horizon line and moves along said course line toward the bottom of the display to indicate the relative distance to said touchdown point as the aircraft approaches theretoward, and positioning means for simultaneously controlling said course line generator means and said further generator means to simultaneously adjust the course line and touchdown mark to different positions on the display.

22. A system as set forth in claim 21 in which said positioning means includes means for providing signals to said course line generator means to position the far end of said course line to indicate heading error, and means for providing signals to said course line generator means to position the near end to indicate VOR/LOC displacement.

23. A system as set forth in claim 22 in which said positioning means includes a first means operative to provide signals to position one end of said course line as a pointer on said horizon line to indicate heading error, and a second means to provide signals to position the other end as a pointer indicating VOR/LOC error, and means for providing signals to said first and second means to adjust the signal output thereof to maintain the same horizontal coordinate for both ends of the pointer with vertical displacement of said horizon line.

24. In a system for providing horizontal situation and attitude information on a raster presentation for a mobile unit having motion about several axes, means for generating at least one reference mark on said display which is adjusted to different vertical positions with changes in pitch, course centerline means for providing a course line on said display, and positioning means including a first means for providing variable waveform signals to position one end of said course line to indicate heading information on said vertically movable reference mark, and second means for providing variable waveform signals to position the other end of said course line to indicate VOR/LOC displacement, and pitch indicator means for providing pitch representative signals to said first and second means to vary the waveforms output therefrom to maintain said course line ends at the same X coordinate with changes in pitch of the unit.

25. A system as set forth in claim 24 in which said positioning means includes a fixed amplitude sawtooth generator for generating a fixed generator sawtooth at the vertical rate of the raster, and said first means includes a variable sawtooth generator for providing a variable sawtooth waveform at the vertical rate of the raster having an amplitude related to the heading error of the unit, and operational means for providing an output signal which is the algebraic sum of the sawtooths provided by said fixed amplitude and said variable amplitude sawtooth generator, and in which said second means includes a further variable sawtooth generator for providing a sawtooth waveform which varies in amplitude with the VOR/LOC displacement of the unit, and further operational means for providing an output signal which is the algebraic sum of the waveforms of said fixed and said further variable sawtooth generators, and in which said pitch indicator means provides signals to each of said sawtooth generators to vary the slope of the waveforms output therefrom with changes in pitch of the mobile unit.

References Cited

UNITED STATES PATENTS

| | | | |
|---|---|---|---|
| Re. 25,756 | 4/1965 | Balding | 178—6.8 |
| 3,237,193 | 2/1966 | Curry et al. | 343—108 |
| 3,309,659 | 3/1967 | Balding | 340—27 |
| 3,331,069 | 7/1967 | Cornell et al. | 178—6.8 |
| 3,418,459 | 12/1968 | Purdy et al. | 340—27 |
| 2,262,245 | 11/1941 | Moseley et al. | 340—27 |

ALVIN H. WARING, Primary Examiner

H. S. COHEN, Assistant Examiner

U.S. Cl. X.R.

178—6.8; 340—324.1